US011954757B2

(12) United States Patent
Ukidave et al.

(10) Patent No.: US 11,954,757 B2
(45) Date of Patent: Apr. 9, 2024

(54) METHOD AND APPARATUS FOR IMPLEMENTING A RASTERIZER IN GPU OPERATIONS

(71) Applicant: ADVANCED MICRO DEVICES, INC., Santa Clara, CA (US)

(72) Inventors: Yash Ukidave, Santa Clara, CA (US); Randy Ramsey, Santa Clara, CA (US); Sukanya Chavan, Santa Clara, CA (US); Zhongliang Chen, Santa Clara, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 168 days.

(21) Appl. No.: 17/564,153

(22) Filed: Dec. 28, 2021

(65) Prior Publication Data

US 2023/0206381 A1 Jun. 29, 2023

(51) Int. Cl.
*G06T 1/20* (2006.01)
*G06T 1/60* (2006.01)
*G06T 11/40* (2006.01)

(52) U.S. Cl.
CPC .......... *G06T 1/20* (2013.01); *G06T 1/60* (2013.01); *G06T 11/40* (2013.01)

(58) Field of Classification Search
CPC ... G06T 1/20; G06T 1/60; G06T 11/40; G06T 15/005; G06T 15/40; G06T 15/80
USPC .......................................... 345/421, 426, 506
See application file for complete search history.

(56) References Cited

U.S. PATENT DOCUMENTS

| 10,649,810 B2* | 5/2020 | Mirza ................... G06F 9/5016 |
| 2015/0348306 A1* | 12/2015 | Yang ....................... G06T 15/80 345/420 |
| 2017/0178386 A1* | 6/2017 | Redshaw .............. G06F 9/5083 |
| 2018/0165872 A1* | 6/2018 | Lefebvre ............... G06T 15/005 |
| 2018/0286005 A1* | 10/2018 | Koker .................... G06F 9/4893 |
| 2020/0005423 A1* | 1/2020 | Bonfiglioli ............... G06T 1/20 |
| 2020/0184715 A1* | 6/2020 | Goswami .............. G06T 15/005 |
| 2020/0293380 A1* | 9/2020 | Ashbaugh ............. G06F 9/3455 |

* cited by examiner

*Primary Examiner* — Jacinta M Crawford

(57) ABSTRACT

An apparatus, such as a graphical processing unit (GPU), includes one or more processors configured to determine a plurality of first locality information of a received wave at a processing unit and to select a first processing element of a plurality of processing elements, the first processing unit having a plurality of second locality information from a previous wave that matches the plurality of first locality information to execute the received wave.

20 Claims, 6 Drawing Sheets

METHOD AND APPARATUS FOR IMPLEMENTING A RASTERIZER IN GPU OPERATIONS

BACKGROUND

To enhance processing efficiency, some processing systems employ a graphics processing unit (GPU) to perform graphics processing tasks. A central processing unit (CPU) sends graphics commands (e.g., draw commands) and, based on the commands, the GPU generates sets of operations to carry out the corresponding graphics processing tasks. To further enhance processing efficiency, the GPU divides the operations into subsets of data, referred to as wavefronts or waves, on which computational operations are performed. The GPU assigns each wavefront to a corresponding set of processing elements for execution of these operations. The processing elements execute the sets of operations on different data in parallel, thus improving processing efficiency. However, conventional techniques for assigning wavefronts to processing elements are sometimes inefficient, and in particular cause inefficient access to memory elements of the GPU.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items. Workgroups are assigned to work on these waves.

DETAILED DESCRIPTION

FIGS. 1-8 illustrate techniques for scheduling wavefronts at processing elements of a GPU based on locality of quads associated with the wavefronts. A rasterizer maintains a locality table that identifies different locality regions of an image frame. The rasterizer further determines, for each wavefront, the locality region associated with the wavefront, and a shader resource manager assigns each wavefront associated with the same locality region to the same set of processing elements. Using these techniques, a GPU reduces the number of memory accesses associated with executing the wavefronts, thereby improving overall processing efficiency at the GPU.

To illustrate, in some embodiments each processing element of a GPU is associated with a cache and, when executing a portion of a wavefront, texture data associated with the wavefront is loaded to the processing element's cache from system memory, so that data associated with textures and surfaces is able to be quickly accessed. Further, the textures associated with a region of an image frame typically do not vary substantially between wavefronts associated with that region. Thus, if a given processing element is consistently assigned wavefronts associated with the same region, the processing element's cache is more likely to already store texture data associated with the wavefront, and therefore less texture data is required to be loaded from main memory.

However, conventional GPUs assign waves to processing units based on load balancing factors, and without regard to the particular frame region associated with the wave. These conventional wave assignment approaches therefore sometimes result in a given processing element being assigned successive wavefronts associated with different regions of the image frame. This in turn results in the processing element generating a large number of memory accesses, as the processing element must repeatedly load primitive data for the different regions to its cache. In some embodiments, primitive data includes texture and shading information for surfaces being processed. In contrast, using the techniques described herein, processing elements are assigned waves based on the locality regions associated with the waves, increasing the likelihood that the caches associated with the processing elements store data associated with their assigned waves, thus reducing the consumption of memory bandwidth and improving processing efficiency at the GPU.

Figure 1:
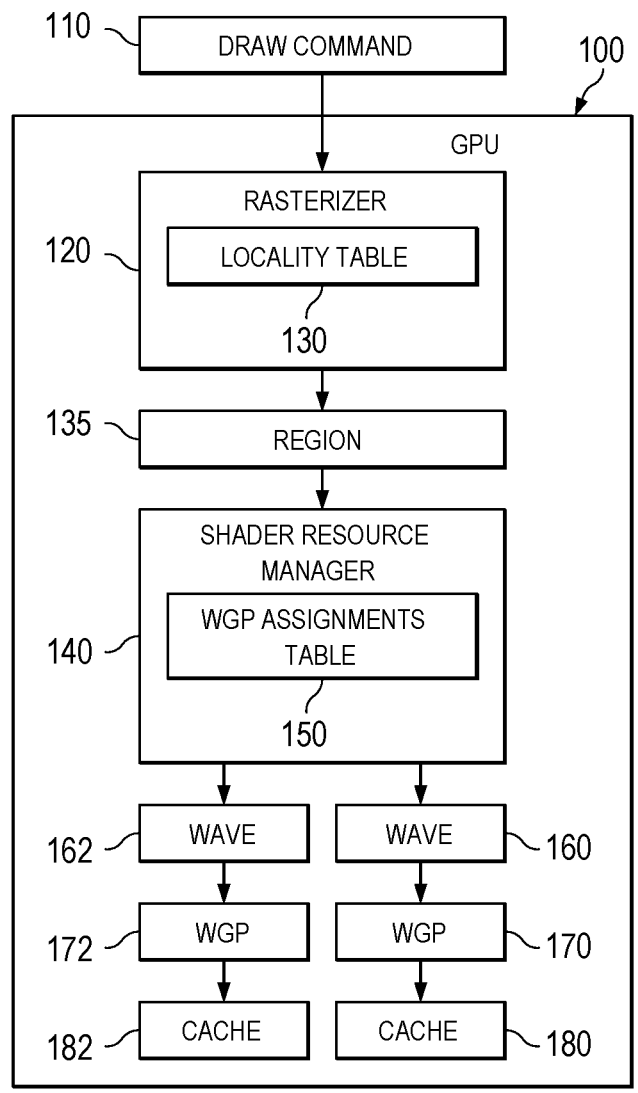
FIG. 1 is a block diagram of a processing system that supports assigning workgroups based on locality in accordance with some embodiments.

FIG. 1 is a block diagram of a graphics processing unit (GPU) 100 that supports assigning wavefronts to processing elements based on the locality associated with each wavefront. In at least some embodiments, the GPU 100 is part of a processing system that is generally configured to execute sets of instructions (e.g., computer programs) in order to carry out specified tasks on behalf of an electronic device. Accordingly, in different embodiments, the GPU 100 is part of one of a variety of electronic devices, such as a desktop computer, laptop computer, server, smartphone, tablet, game console, and the like. The GPU 100 is generally configured to receive commands (e.g., draw command 110) from another processing unit, such as a central processing unit (CPU), and execute a set of graphics operations based on the received commands.

To support execution of the graphics commands, the GPU 100 includes a rasterizer 120, a shader resource manager 140, a plurality of processing elements (e.g., compute units (CUs) 170, 172), and a set of caches (e.g., caches 180, 182). The rasterizer 120 is generally configured to generate, based on received commands such as the draw command, wavefronts for execution at the processing elements of the GPU 100. The rasterizer determines which screen space pixels are covered by each primitive and converts the primitives into quads. These quads are then sent to the shader resource manager 140 based on where the quads are located in screen space. In at least some embodiments, the wavefronts are sets of data that will be operated on by similar or the same instructions (e.g., different pixels of an image), and are therefore able to be executed in parallel by the processing elements.

The shader resource manager 140 is configured to receive waves from the rasterizer 120 and to assign those waves to the processing elements of the GPU 100 as described further herein. The processing elements of the GPU 100 are configured to receive their assigned waves and execute the operations of each received wave. For purposes of description, FIG. 1 is described with respect to an example embodiment where waves are assigned at the granularity of a CU, but it will be appreciated that, in other embodiments, the techniques described herein are applied at a different level of processing element granularity, or at more than one level. For example, in some embodiments, the GPU 100 includes a plurality of workgroup processors (WGPs), with each WGP including a plurality of CUs, and the shader resource manager 140 assigns the waves to individual WGPs, while in other embodiments, the shader resource manager 140 assigns waves to particular sets of CUs. Furthermore, it will be appreciated that although only two CUs are illustrated at FIG. 1 for simplicity, in other embodiments the GPU 100 includes additional WGPs, CUs, or any combination thereof.

Each of the CUs 170 and 172 is a processing element including a number of circuits, also referred to as units, configured to execute the sets of operations corresponding to the CUs assigned waves. For example, in some embodiments the CUs 170 and 172 each include a plurality of single instruction multiple data (SIMD) units configured to execute the operations of a wave in parallel on different data, such as different pixel data of an image. Each of the CUs 170 and 172 is associated with a cache, designated caches 180 and 182, respectively. The CUs 170 and 172 employ the respective cache to store data for execution of wave operations. In response to particular data requested by a CU not being stored at the corresponding cache, the CU retrieves the data from another level of a memory hierarchy associated with the GPU 100, such as from system memory (not shown).

As explained above, retrieving data for the caches 180 and 182 consumes system resources, and reducing the overall number of data retrievals at the caches 180 and 182 therefore improves overall processing efficiency of the GPU 100. Accordingly, to reduce the amount of data retrievals (that is, the number of memory accesses to system memory or other levels of the memory hierarchy), the GPU 100 employs a locality-based wave assignment process, wherein waves are assigned to the CUs 170 and 172 based on the region of an image frame associated with the wave. To support assigning waves based on locality, the rasterizer 120 maintains a locality table 130 to identify the locality associated with each wave 160 and 162, and the shader resource manager 140 maintains a WGP assignments table 150 that indicates which of the CUs 170 and 172 is assigned to each region.

To illustrate, in some embodiments, in response to identifying a wave based on the draw command 110, the rasterizer 120 further identifies a region associated with the wave. For example, in some embodiments the rasterizer 120 identifies the set of graphics primitives associated with the draw command 110, and further the quads from which the primitives are composed. In some embodiments, a quad refers to a 2×2 region of pixels that are aligned and justified to the screen space X,Y grid. In at least some embodiments, the rasterizer 120 then identifies the region, of an image frame, that contains the majority of the identified quads that are valid. A valid quad is a quad that has at least one valid pixel. In some examples, pixels that are not seen, overlapped by a wave with an opaque texture, or not covered by a primitive indicate that a quad is invalid. In other embodiments, the rasterizer identifies a plurality of regions for each wave, with the plurality of regions ranked based on the number of quads identified in each region.

The rasterizer 120 stores at the locality table 130 a plurality of entries, where each entry includes an index including region information indicative of the one or more identified regions. In response to identifying the regions associated with a wave, the rasterizer 120 accesses the locality table 130 table to identify the index associated with at least one of the identified regions. If the locality table 130 does not include an entry having at least one of the identified regions, in some embodiments the rasterizer 130 creates a new table entry with the identified regions, or replaces one of the entries (e.g., based on a least recently used (LRU) scheme) with the identified regions and a new index. If the locality table 130 includes multiple entries that have at least one of the identified regions, the rasterizer 120 selects the entry corresponding to the region identified as having the most quads for the corresponding wave.

The shader resource manager 140 maintains the WGP assignments table 150 to include a plurality of entries, with each entry including an index and a CU assigned to that index. For each wave, the rasterizer 120 provides region information 135 that includes both the index of the locality table 130 identified for the wave and a locality bit, indicating whether the wave is associated with a region that has previously been identified (that is, the region previously had an entry at the locality table 130). If the locality bit indicates a previously unidentified region, the shader resource manager 140 assigns the wave to one of the CUs based on a specified scheme, such as a round-robin scheme or another load balancing scheme. The shader resource manager 140 also adds an entry to the WGP assignments table 150 with the received index, and with the CU that was assigned to the wave (or replaces a previously used entry with this information). If the locality bit indicates a previously-identified region, the shader pre-processor accesses the WGP assignments table 150, using the received index, to identify the CU that was previously assigned for the identified region, and attempts to assign the wave to the identified CU.

In some cases, the identified CU is not available for scheduling due to, for example, the CU being in the process of executing another wave. In these cases, the shader resource manager 140 assigns the CU based on another scheme, such as round-robin or other load balancing scheme. The shader resource manager 140 then updates the WGP assignments table 150 so that the wave index is associated with the newly assigned CU.

Thus, the shader resource manager 140 maintains the WGP assignments table 150 to indicate, for a set of regions, the CUs that were previously assigned to execute waves associated with those regions. Using the locality information provided by the rasterizer 120, the shader resource manager 140 attempts to assign each wave to a CU that previously executed waves associated with the same region. This increases the likelihood that the CUs will, for each wave, use data that is already stored at the corresponding cache. This in turn reduces the overall number of memory accesses at the GPU 100 and improves overall processing efficiency.

Figure 2:
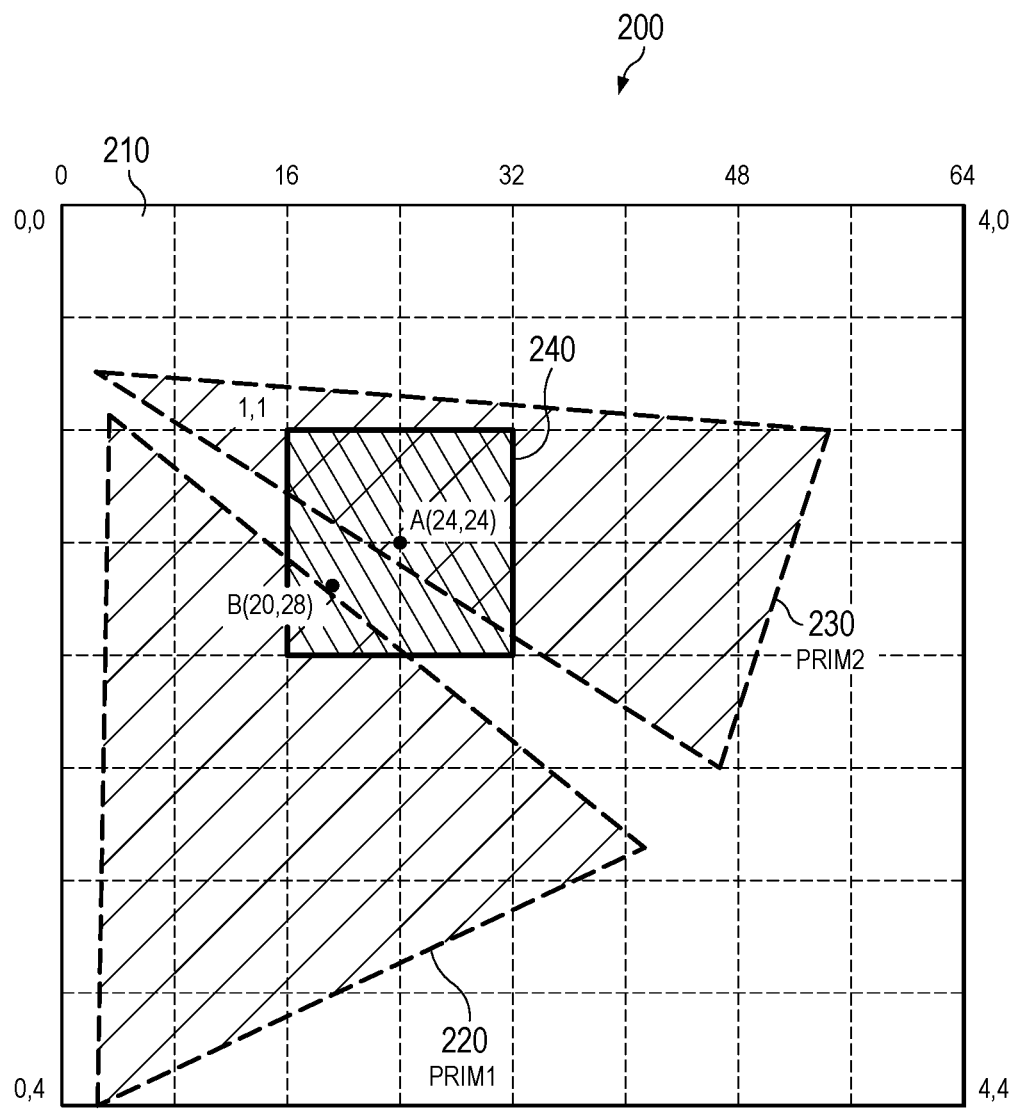
FIG. 2 is an illustration of the processing system of FIG. 1 determining a locality of a set of primitives in accordance with some embodiments.

FIG. 2 is a diagram illustrating an example of an area of image frame 200 in accordance with some embodiments. The image frame 200 is associated with the draw command 110, that contains a set of primitives are to be processed by rasterizer 120 of GPU 100 of FIG. 1. In this example, the rasterizer 120 examines the image frame 200 to determine the number of primitives in each region. Primitives are considered to be local to each other when the primitives are contained in the same region. In at least some embodiments, a wave is considered local to a region if that region contains a majority of identified primitives.

In the illustrated embodiment, an image frame 200 area of 64×64 pixels is analyzed and within the 64×64 pixel space, smaller pixel areas are identified as the basis for locality of primitives within the wavefront. In this embodiment, the locality regions are assessed based on 4×4 pixel regions. In one locality region, box 210 describes a 16×16 pixel region located at LocalX value of 0 and a LocalY value of 0. In some embodiments, the locality table 130 includes an entry that describes a bounding box dimension of the area of the region that will be assessed. In other embodiments, different sized image frames and locality regions are employed and a larger frame image is divided into many smaller regions to process like image frame 200 which is based on the bounding box dimension.

The location of these 4×4 pixel regions which form the basis of the index are contained within the locality table 130 in FIG. 1. As described below, if a locality region has a majority of primitives contained within that region, then that region is identified for the purpose of assigning CU's to work on that locality region in such a manner so as to increase a likelihood that the caches associated with CU's store data associated with these identified primitives, thus reducing the number of memory accesses and improving processing efficiency at the GPU.

Within image frame 200, two primitives 220 and 230 from the incoming wave are present. Primitive 220 and primitive 230 span several locality regions, touching almost every locality region except locality region 4,4. Each primitive includes a corresponding set of pixels. The rasterizer 120 derives a LocalX and LocalY values for each covered quad from the primitives within the image frame. The Local X,Y values designate a position of the quad within the locality region being considered. Quads from primitives can be in any of these regions. The LocalXY is the per-quad XY stating its locality region. In this example, the rasterizer 120 determines that the first primitive 220 has a LocalX value of 20 and a LocalY value of 28 at point B. The rasterizer 120 further determines that the second primitive 230 has a LocalX value of 24 and a LocalY value of 24 at point A. In this example, Point A and Point B represent portions of different primitives from different waves which fall into the same local region. Because of this locality, these different primitives may have similar textures, even if they are different primitives.

In some embodiments, once all the quads that form a wavefront are collected the dominant XY is calculated to determine which locality region the entire wave belongs to. If a majority of one or more of the majority of primitives fall in one locality region, then that wave is considered to be part of that locality region with a dominant XY for the region (DomX, DomY) to specify which locality region the entire wave belongs to. In FIG. 2, it is apparent that points A and points B fall within the 16×16 pixel region of 1,1, and they both fall in the same local region 240 illustrated as quad (1,1). Accordingly, the dominant coordinates for this example are considered a DomX of 1 and a DomY of 1 in locality region 240. Referring to FIG. 1, rasterizer 120 updates the locality table 130 with the information of the dominant coordinates for this image frame of the wave being analyzed.

Figure 3:
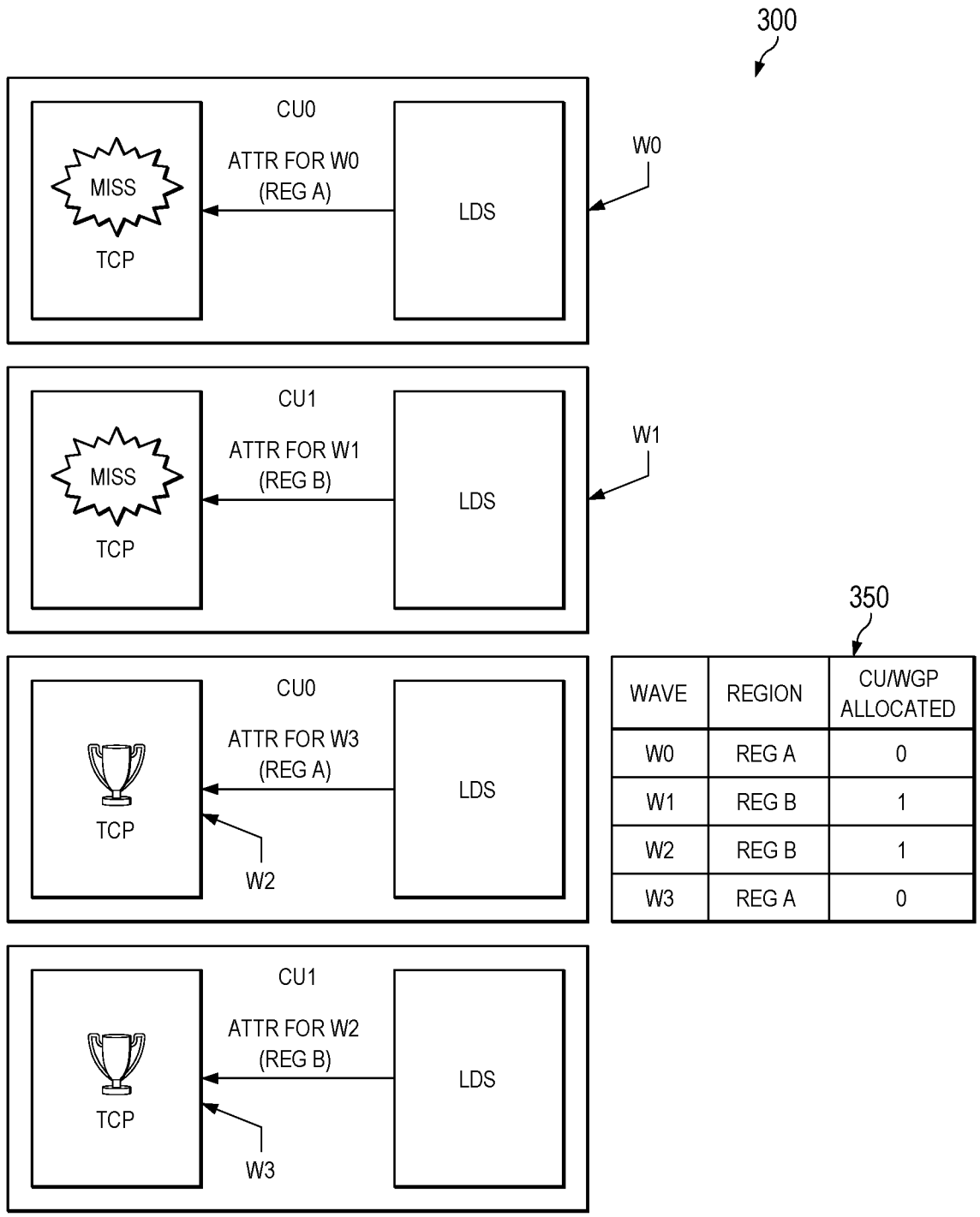
FIG. 3 is an illustration of updating a locality table of FIG. 1 according to some embodiments.

FIG. 3 illustrates an example 300 of an updating a locality tables, such as the locality table 130 of FIG. 1. In example 300, four waves W0, W1, W2, and W3 are being processed. Waves W0 and W3 were each found to have primitives that appear the same locality region of Reg. A within their image frames. Similarly, waves W1 and W2 were each found to have primitives that appear in the same locality region of Reg. B within their image frames. Regions A and B may have been associated with the respective waves as illustrated in FIG. 2 where a screen space or image frame was analyzed for valid quads and then a dominant locality region for those waves was found.

In addition, in example 300 of FIG. 3, compute unit 0 (CU0) and compute unit 1 (CU1) are shown accessing the respective caches 180 and 182 of a respective wavefront. In this embodiment, it is assumed that CU0 is accessing cache 180 while CU1 is accessing cache 182. CU0 and CU1 are first illustrated as experiencing a "miss" because their respective caches 108 and 182 for waves W0 and W1 are receiving data from system memory for the first time. However, waves W2 and W3 are not illustrated as experiencing a "miss" because CU0 and CU1 are assigned to waves W2 and W3 based on their processing the same regions, Reg. A and Reg. B., thereby having each CU already preloaded with respective data for the region.

In example 300, waves W0 and W3 were found to be local to region A (Reg A). As W0 and W3 are to the same region, they are assigned the same CU/WGP (CU0). Similarly, waves W1 and W2 were found to share region B (Reg B). The assignment of waves W0 and W3 to CU0 while waves W1 and W2 are assigned to CU1 illustrates a selection of CU's according to locality information found within incoming waves according to an operation of rasterizer 120 of FIG. 1 thus reducing the number of memory accesses and improving processing efficiency at the GPU for this series of waves.

Referring back to FIG. 2, it was determined that the dominant region for this wave was (1,1) because the majority of valid primitives for the wave falls within that one locality region. Information regarding the dominant region is then entered into a locality table along with an identification of whether the wave has the property of being local to other waves. Referring again to FIG. 3, table 350 includes data fields for a wave identification, locality regions, and allocated CU's based on example 300 to show which regions are assigned to which CU.

FIG. 3 illustrates how a locality table of the rasterizer and WGP assignments table of the shader resource manager 120 are populated according to different configurable parameters. One such parameter includes a depth of the locality table which defines how many locality regions are being tracked at a time. Other parameters include a maximum number of local waves allowed in one region (local_wave_limit) and a locality region bounding box dimension (locality_region_bounding_box). In one embodiment of the invention, the locality table implements single region tracking. In single region tracking, a current wave is checked against a previous wave. In other embodiments, the locality table implements multi-region tracking where the current wave is checked against multiples of previous waves.

In FIG. 3, table 350 is shown that represents how each of the waves are assigned to different CU's based on the dominant region that was determined for each wave. In the example 300 illustrated by FIG. 3, the regions in the region table are updated based on the generation of each wave W0, W1, W2, and W3, as discussed below. In order to avoid an inefficient allocation of memory that a random assignment of a CU to these waves that may incur in conventional graphics processing, the assignment of CU's to the waves places waves with similar dominant regions to the same CU's that have previously processed that dominant region to ensure an efficient loading of primitive data into CU caches.

In contrast to the example 300, a conventional graphics processing system assigns waves W2 and W3 randomly to a first available CU, then each succeeding wave would require the primitive data to be retrieved to its cache, thereby resulting in an increase of latency as the new data is loaded to the CU's cache. Instead, in the example 300 of FIG. 3, only waves W0 and W1 require data to be loaded to the corresponding cache because these are the first instances of Reg A and Reg B. Therefore, compute unit CU0 is assigned to Reg A in both waves W0 and W3 because these waves are local to each other while compute unit CU1 is assigned to Reg B in both waves W1 and W2 because these waves are local to each other.

Figure 4:
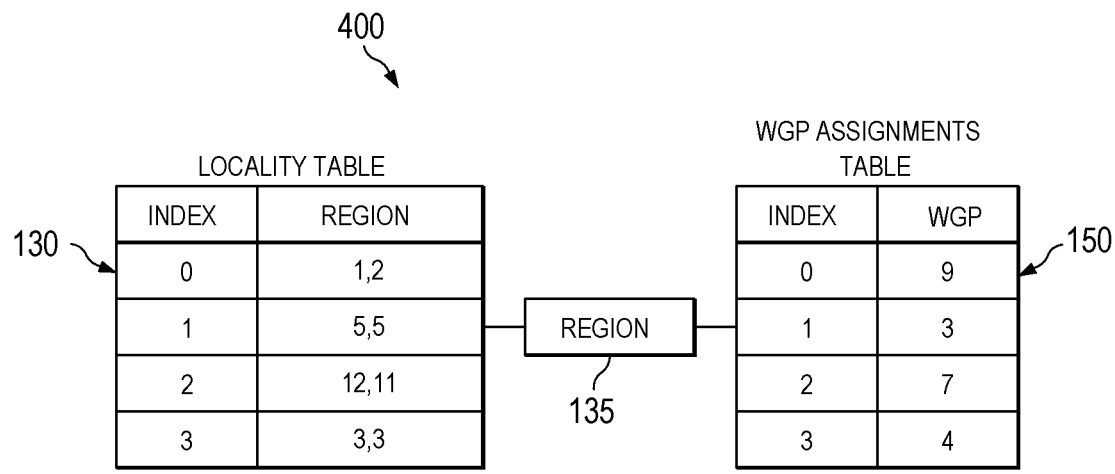
FIG. 4 is an illustration of an updating a workgroup assignment table of FIG. 1 in accordance with some embodiments.

FIG. 4 is an illustration 400 of updating the WGP assignments table 150 of FIG. 1 in accordance with some embodiments. In this instance, the locality table 130 is illustrated as containing a wave number index and a related dominant XY for the locality regions as described above. Rasterizer 120 transmits region information 135 to WGP assignments table 150. In some embodiments, the transmission of data may occur between the rasterizer 120 and shader resource manager 140 of FIG. 1 where the information from locality table 130 is provided to update the WGP assignments table 150. In some embodiments, the rasterizer 120 provides the region information to the shader resource manager 140 where the shader resource manager 120 updates the WGP assignments table 150.

WGP assignments table 150 stores a preferred CU for a particular wave which is identified by its index. That is, WGP assignments table 150 does not have to store the location of dominant regions for the waves themselves. Instead, WGP assignments table 150 is updated by the region information 135 which is in turn based on the locality of the incoming wave. In some embodiments, the locality information is simply transmitted as an index value, as "Locality_Index", and a single bit, as "Locality_info". The locality bit simply states whether the wave is local or not to a previous wave stored within the locality table 130. The index value is the index of the previous wave in the locality table 130 which matches the dominant coordinates of the incoming wave which will be assigned to the CU and/or updated according to embodiments discussed below.

For each incoming wave, the local bit is checked. If the incoming wave is local, then the WGP assignments table 150 is consulted and then a CU associated with that index is assigned to the wave. The assignment of the CU is dependent upon the CU having resources available to process the wave. If the incoming wave is not local, WGP assignments table 150 simply assigns an available CU to the wave. If the incoming wave is not local, which occurs in an event that the locality table 130 has updated a locality region, then the WGP assignments table 150 replaces a preferred CU in its index with a new CU, a replacement index. That is, the CU for this index is replaced, or reallocated, with the new CU.

Next, in an instance where the incoming wave is local, WGP assignments table 150 will attempt to allocate the incoming wave with that index with the preferred CU. If the preferred CU cannot be allocated, then another CU will be allocated. The preferred CU in the WGP assignments table 150 is then updated with the index from the newly allocated CU.

Figure 5:
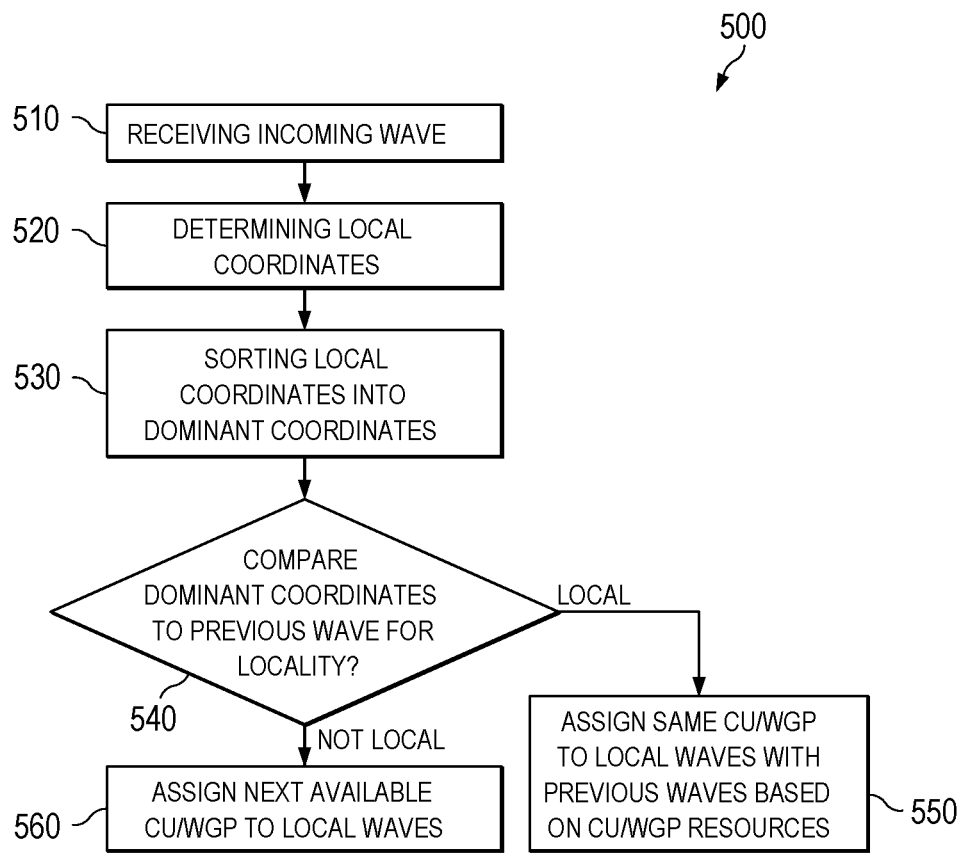
FIG. 5 is a flow diagram illustrating a method for assigning workgroups based on locality in accordance with some embodiments.

FIG. 5 is a flow diagram illustrating a method 500 of updating a WGP assignments table of a shader resource manager and a locality table of a rasterizer according to some embodiments. The method 500 is implemented in some embodiments of GPU 100 shown in FIG. 1.

In a GPU that is performing graphical operations, incoming waves are received at block 510. The incoming wave is analyzed for the presence of primitives in an image frame to find local coordinates for these elements at block 520. For example, in one example of an image frame, primitives from one or more waves are analyzed to determine which locality regions the primitive elements are present within. In another example, the locality region is defined as a box of pixels as illustrated in FIG. 2 where the box 210 is defined as sub-regions of an image frame where pixels and quads of the image frame are represented. Within this box, local coordinates, LocalX and LocalY, for valid primitives are found.

In some embodiments, the local coordinates are sorted into dominant coordinates at block 530. Each valid wave is assessed to determine if a majority of the local quad coordinates of the quads fall inside of one locality region. When a majority of quads for a wave fall into the same region, then that wave is considered to be part of that locality region and designated as dominant XY coordinates. Dominant XY coordinates between waves are compared at block 540. This comparison will result in a finding of whether or not an incoming wave is local with previous waves. The incoming wave is local with previous waves when the locality table shows a match of the incoming wave's dominant XY coordinates and registered dominant XY coordinates of a previous wave.

In some instances, half of the valid quads of an incoming wave fall into one locality region while the other half of valid quads may fall into another locality region. In this case, it may not be feasible to assign dominant coordinates based on the localXY of the majority of valid quads. In one embodiment, a pessimistic locality option is selected where the result of such a split is that the incoming wave is considered to have no dominant coordinates and that incoming wave is therefore not local to any previous wave. In another embodiments, the incoming wave is considered to have two dominant coordinates and therefore the incoming wave is considered to be local to previous waves that match either of the dominant coordinates.

In some embodiments, where the incoming wave is found to be local with one or more previous waves, the assignment of a CU for that incoming waves is based on the assignment of that incoming wave with the CU already assigned to the previous wave having a matching locality at block 550. In some embodiments, where the incoming wave is found to not be local with previous waves, the assignment of a CU for that incoming waves is performed on a next available CU at block 560.

Figure 6:
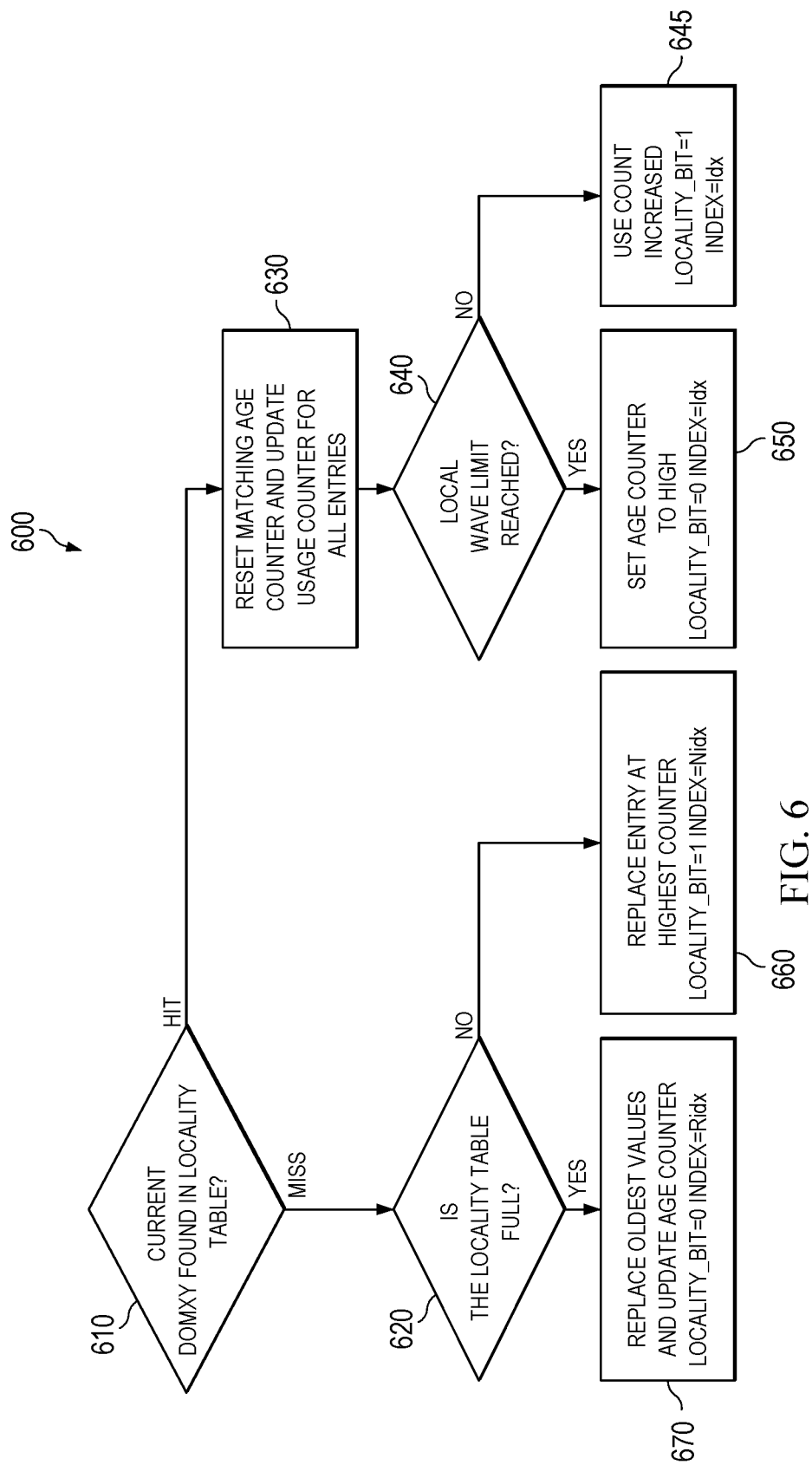
FIG. 6 is a flow diagram illustrating a method for updating a locality table in accordance with some embodiments.

FIG. 6 is a flow diagram illustrating a method 600 of updating a locality table of a rasterizer according to some embodiments. The method 600 is implemented in some embodiments of GPU 100, rasterizer 120, and locality table 130 shown in FIG. 1. In some embodiments, the locality table is scanned for the current dominant coordinates of the incoming wave for matching dominant coordinates from previous waves within the locality table at block 610. In some embodiments, the locality table 130 includes additional information, such as an age counter for each entry in the locality table 130. The age counter allows for updating of older entries in the locality table 130. The additional information also includes a use counter which increments every time there is a hit when scanning the locality table at block 610. The additional information also includes a max table depth which describes the maximum number of entries in the locality table 130. The additional information also includes a table depth count which is compared to the max table depth to determine table fullness at block 620. The additional information for the locality table 130 includes a maximum number of local waves allowed in one region, described below as a local wave limit.

The locality table 130 of FIG. 1 includes one or more entries containing the dominant coordinates of previous waves. If the locality table does not match the dominant coordinates of the incoming wave, that is if there is a miss, and the locality table 130 is checked for fullness at block 620. If the locality table 130 is full, an entry at the highest value for the age counter is replaced by the newest dominant coordinates and the age value for all entries in the locality table 130 is updated. The value for this wave includes the local bit being set to zero and a value of the index is set to the value of the entry with the highest age counter value at block 670, represented as "Ridx" because the entry with the highest age count is replaced.

If the locality table is not full when there is a miss, the age counter for all entries is increased and the index value is pushed to the first empty index position 660. In addition, the locality bit is set to a value of one while the index value is set to that first empty index value, represented as "Nidx".

When there are matches with the incoming wave's dominant coordinates, there is said to be a hit, resulting in the age counter for entries being increased while the age counter for the index of the matching previous wave is reset at block 630. Next, it is determined whether the local wave limit has been reached for the index at block 640. When the local wave limit has not been reached, the use count for the index is increased at block 645. The locality bit is set to one and the index value is set as the index that was hit, here represented as "Idx". That is, the locality index sent via the region information 135 is based on the previous entry in the locality table 130 that matches the incoming wave's dominant coordinates.

When the local wave limit for the index has been reached, then the age counter is set to a "high" value at block 650. Setting the age counter to "high" will result in a replacement of that index in a next iteration of method 600 while the use count for this index is reset because the next time the index is utilized, it will be assigned to a new CU. Accordingly, the locality bit is set to zero while the index value is set as the index that was hit, also represented as "Idx", which is the index value of the previous entry in the locality table 130 that matches the incoming wave's dominant coordinates.

Figure 7:
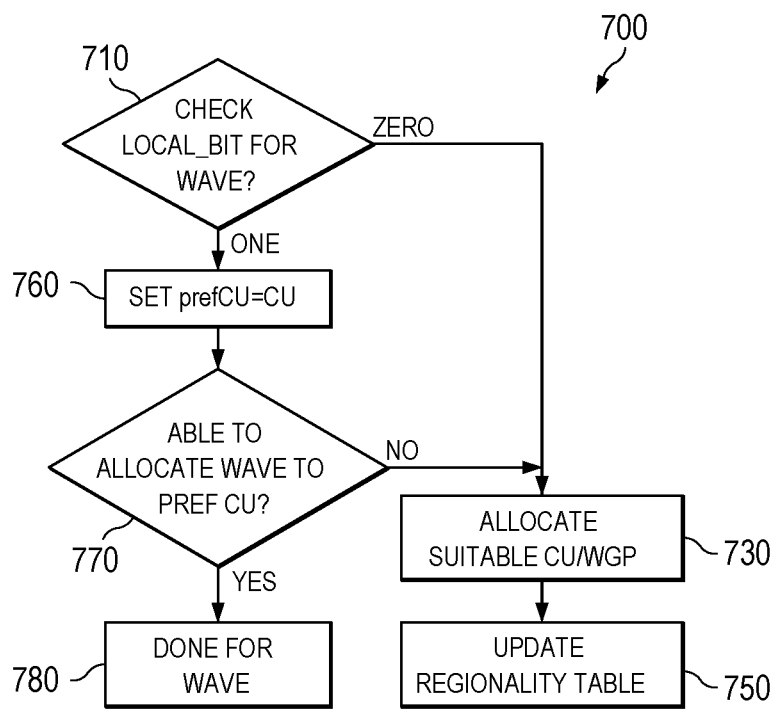
FIG. 7 is a flow diagram illustrating a method for updating a WGP assignments table based on locality in accordance with some embodiments.

FIG. 7 is a flow diagram illustrating a method 700 of updating a region assignments table of a shader resource manager according to some embodiments. The method 700 is implemented, in some embodiments, at GPU 100, shader resource manager 140, and WGP assignments table 150 shown in FIG. 1. As illustrated in FIG. 4, locality table 130 provides region information 135 to WGP assignments table 150. The region information 135 includes a locality bit and the locality index value. In method 700, the locality bit is checked for the incoming wave at block 710. If the locality bit is a zero value, then the incoming wave is allocated to a suitable CU/WGP because the incoming wave is not local to a previous wave and there will necessarily be a "miss" as illustrated in either one of waves W0 and W1 of FIG. 3. To assign the incoming wave to the next available CU, the locality table or WGP assignments table is updated at block 750.

If the locality bit value is a one, then an index for the preferred computing unit value is set to the CU index identified in the locality index value at block 760. The preferred CU is based on the locality index provided in the region information 135 from the locality table 130. Method 700 then checks whether the region assignment is able to allocate the incoming wave to the preferred CU at block 770. If the incoming wave is successfully allocated to the preferred computing unit then the work is done for this wave at block 780. The incoming wave having the same dominant region as a previous wave is therefore be processed by a CU being preloaded. If the incoming wave cannot be allocated to the preferred computing unit, then an available CU is assigned to the wave at block 730.

Figure 8:
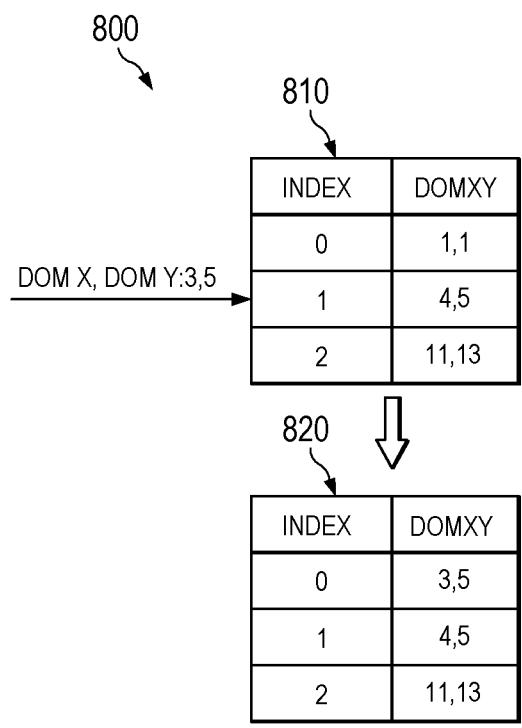
FIG. 8 is an illustration of the processing system of FIG. 1 updating a locality table in accordance with some embodiments.

FIG. 8 is an illustration 800 of updating the locality table 130 of FIG. 1 according to embodiments of the invention. In FIG. 8, initial locality table 810, representative of an example of content within locality table 130, is illustrated as containing a number of wave indexes assigned to a number of dominant coordinates for locality regions. In this example, the initial locality table 810 receives information regarding dominant coordinates as illustrated by region information 135 in FIG. 4 and employing method 600 of FIG. 6. In this instance, the incoming dominant coordinates for the incoming wave are DomX=3, DomY=5. The initial locality table 810 in this embodiment is illustrated as being 3 regions deep. As illustrated, initial locality table 810 will be updated with the incoming dominant coordinates. In this embodiment, a least used replacement policy is employed. In this example, index 0 has been determined to the least recently used (LRU) region. That is, index 0 has gone the longest time among all the entries in locality table 130 since a wave was local in that region, here region (1,1).

FIG. 8 illustrates the content in updated locality table 820 which shows the LRU region represented as index 0 has been replaced with the newly arrived dominant coordinates for the incoming wave. Therefore, index 0 now contains the locality region having X,Y coordinates of 3,5. Furthermore, it is apparent from this example that the incoming wave is not local to any previous wave stored within updated locality table 830. In some embodiments, the WGP assignments table 150 will be updated with the information regarding the incoming wave. In this instance, the update includes the locality index and the locality information bit indicating the index of zero and a locality bit of zero. Next, the WGP assignments table of the shader resource manager is updated in accordance with method 700 of FIG. 7 discussed above.

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method, comprising:
   determining a first locality of a received wave based on dominant coordinates of the received wave at a processing unit; and
   selecting, based on the first locality, a first processing element of a plurality of processing elements to execute the received wave, wherein each of the plurality of processing elements is associated with a different cache memory.

2. The method of claim 1, wherein the determining the first locality comprises determining local coordinates for quads of incoming primitives associated with the received wave.

3. The method of claim 2, further comprising sorting the dominant coordinates for each incoming primitive where a majority of the local coordinates reside in a same locality region.

4. The method of claim 1, further comprising selecting a second processing element to execute the received wave responsive to determining a plurality of previous localities from a plurality of previous waves does not match the first locality to execute the received wave.

5. A method, comprising:
   tagging an incoming wave as a local wave when one or more previous dominant coordinates stored in a rasterizer from one or more previous waves matches dominant coordinates of the incoming wave; and
   assigning a workgroup assigned to the previous waves from the one or more previous waves that matches the incoming wave as a same workgroup.

6. The method of claim 5, further comprising updating a locality table with the dominant coordinates of the incoming wave.

7. The method of claim 6, wherein the updating the locality table comprises using a least recently used region to update the locality table with the dominant coordinates of the incoming wave.

8. The method of claim 7, further comprising assigning the incoming wave to a next available processing element when the previous dominant coordinates for the one or more previous waves does not match the dominant coordinates from the incoming wave.

9. The method of claim 5, wherein the tagging further comprises:
   calculating a plurality of locality values for each of a plurality of valid primitives in the incoming wave; and
   determining a locality region that contains a majority of the plurality of locality values.

10. The method of claim 9, further comprising assigning coordinates of the locality region containing the majority of the plurality of locality values as the dominant coordinates.

11. The method of claim 5, wherein the assigning the workgroup comprises receiving, by a region assignment table, an index of the incoming wave and assigning a workgroup processor in the region assignment table according to whether the incoming wave is assigned as local or not local.

12. A graphics processing unit (GPU), comprising:
   a plurality of processing elements; and
   a shader resource manager configured to assign an incoming wave to a selected first processing element, the first processing element selected based on a locality identified for the incoming wave, wherein the locality is identified based on dominant coordinates of the incoming wave.

13. The GPU of claim 12, wherein the shader resource manager is configured to assign the incoming wave to a next available workgroup processor when the locality information does not indicate a local wave.

14. The GPU of claim 12, further comprising a rasterizer configured to store a locality table, wherein the rasterizer updates the locality table upon receipt of the incoming wave with the dominant coordinates for a plurality of primitives from the incoming wave.

15. The GPU of claim 14, wherein the one or more previous waves are determined to be local to the incoming wave when a previously stored dominant coordinate for the one or more previous waves matches the dominant coordinates from the incoming wave.

16. The GPU of claim 14, wherein the rasterizer is to determine which quads are valid quads from among the primitives.

17. The GPU of claim 16, wherein the rasterizer is to determine local coordinate values for the valid quads.

18. The GPU of claim 17, wherein the rasterizer is to determine the dominant coordinate is based on the locality score of a majority of the valid quads in a same locality region.

19. The GPU of claim 12, wherein the processing element comprises a compute unit.

20. The GPU of claim 12, wherein the processing element comprises a workgroup processor.

* * * * *